United States Patent [19]

Jasinski

[11] Patent Number: 5,331,431
[45] Date of Patent: Jul. 19, 1994

[54] METHOD AND APPARATUS FOR TRANSMITTING AND RECEIVING ENCODED DATA

[75] Inventor: Leon Jasinski, Ft. Lauderdale, Fla.

[73] Assignee: Motorola, Inc., Schaumburg, Ill.

[21] Appl. No.: 937,085

[22] Filed: Aug. 31, 1992

[51] Int. Cl.$^5$ ............................................. H04N 1/40
[52] U.S. Cl. .................................. 358/462; 358/448; 358/453
[58] Field of Search ............... 358/462, 400, 467, 448, 358/401, 443, 447, 453; 382/47, 54, 57; 379/56, 58, 61, 100

[56] References Cited

U.S. PATENT DOCUMENTS 4,566,039 1/1986 Oya ..................................... 358/462
4,977,602 12/1990 Beato ................................... 382/47

Primary Examiner—Edward L. Coles, Sr.
Assistant Examiner—Thomas D. Lee
Attorney, Agent, or Firm—R. Louis Breeden

[57] ABSTRACT

A method of transmitting and receiving encoded data generated from input data comprising readable text characters (102) in a communication system having an optical character recognition element (206) and a graphic encoding element (208), the communication system also having a transmitter (114) and a receiver (116), comprises accepting (602) the input data comprising the readable text characters (102) by a facsimile input (202). The method further comprises encoding (620, 622) as character code format data the readable text characters (102) received that are recognizable by the optical character recognition element (206), and encoding (610, 612, 614) as graphic code format data the readable text characters (102) received that are not recognizable by the optical character recognition element (206). The method further comprises assembling (632) the character code format data and the graphic code format data into an output data stream, the output data stream including information that describes original sizes and positions relative to one another of the readable text characters (102).

18 Claims, 5 Drawing Sheets

METHOD AND APPARATUS FOR TRANSMITTING AND RECEIVING ENCODED DATA

FIELD OF THE INVENTION

This invention relates in general to communication systems, and more specifically to communication systems for transmitting and receiving encoded data generated from readable text characters.

BACKGROUND OF THE INVENTION

Communication systems for receiving alphanumeric input from a keyboard device and transmitting the received text to a portable receiver such as a selective call receiver are well-known in the art. A drawback to such systems is that a suitable keyboard device may not always be conveniently available to a person desiring to send a text message. One way around this drawback is to provide one or more facsimile inputs for the communication system, the facsimile inputs being compatible with a standard protocol used for communications between facsimile machines. Then, the person desiring to send the text message may print the message on a sheet of paper and send it from a facsimile machine to the communication system.

Because the message comprises scanned text characters, to save transmission time the communication system typically uses conventional optical character recognition (OCR) techniques to convert the characters into character codes, e.g., ASCII codes. The use of OCR causes a new problem, because OCR may not be able to recognize 100% of the human-readable characters in a message. This is particularly true when the message comprises hand printed or handwritten characters.

Conventional OCR systems use various algorithms to determine a confidence level for the recognition of each character. When the confidence level is below a predetermined level, conventional OCR systems substitute a special character, e.g., "?" for the unrecognizable character. If a message contains too many such unrecognizable character substitutions, the message may become indecipherable when it arrives at the portable receiver. This can occur even for a message that would have been human readable if received as a facsimile and printed on a sheet of paper by a facsimile machine.

Thus, what is needed is a better method and apparatus for encoding, transmitting, and receiving text messages sent from facsimile machines and accepted by facsimile inputs in a communication system.

SUMMARY OF THE INVENTION

One aspect of the present invention is a method of transmitting and receiving encoded data generated from input data comprising substantially readable text characters in a communication system having an optical character recognition element and a graphic encoding element, the communication system also having a transmitter and a receiver, the method comprising the steps of:

(a) accepting the input data comprising the substantially readable text characters at an input;

(b) encoding as character code format data the substantially readable text characters received in step (a) that are recognizable by the optical character recognition element;

(c) encoding as graphic code format data the substantially readable text characters received in step (a) that are not recognizable by the optical character recognition element; and (d) assembling the character code format data encoded in step (b) and the graphic code format data encoded in step (c) into an output data stream, the output data stream including information that describes original sizes and positions relative to one another of the substantially readable text characters.

Another aspect of the present invention includes a communications controller in a communication system that transmits encoded data generated from input data comprising substantially readable text characters. The communications controller comprises an input receiver for accepting the input data and a processor coupled to the input receiver for processing the input data. The processor comprises an optical character recognition element for encoding a first portion of the substantially readable text characters of the input data into character code format data, and a graphic encoder for encoding a second portion of the substantially readable text characters of the input data into graphic code format data. The processor further comprises a position description element for describing original positions relative to one another of the substantially readable text characters. The communications controller further comprises a memory coupled to the processor for storing encoded data generated by the optical character recognition element and the graphic encoder, and a transmitter controller coupled to the processor for controlling the transmission of the encoded data.

Still another aspect of the present invention is a selective call receiver for use in a communication system that transmits and receives encoded data generated from input data comprising substantially readable text characters, the selective call receiver comprising a receiver for receiving transmitted signals comprising the encoded data and a decoder for decoding a selective call address. The selective call receiver further comprises a conversion element coupled to the receiver for converting the encoded data into locally generated text characters and graphic images of text characters. The conversion element comprises a sizing element for sizing the graphic images of text characters relative to the locally generated text characters to substantially reproduce the original scales of the substantially readable text characters relative to one another. The conversion element further comprises a positioning element for positioning the graphic images of text characters relative to the locally generated text characters to substantially reproduce the original positions of the substantially readable text characters relative to one another. The selective call receiver further comprises a display coupled to the conversion element for displaying the displayable text characters and graphic images.

BRIEF DESCRIPTION OF THE DRAWINGS

FIG. 4 depicts a text message received at a facsimile input, shown as the message would appear if printed by a facsimile machine receiving the same input signals present at the facsimile input, in accordance with the preferred embodiment of the present invention.

FIG. 5 depicts a reproduction of the text message as reproduced in the selective call receiver in accordance with the preferred embodiment of the present invention.

DESCRIPTION OF THE PREFERRED EMBODIMENT

Figure 1:
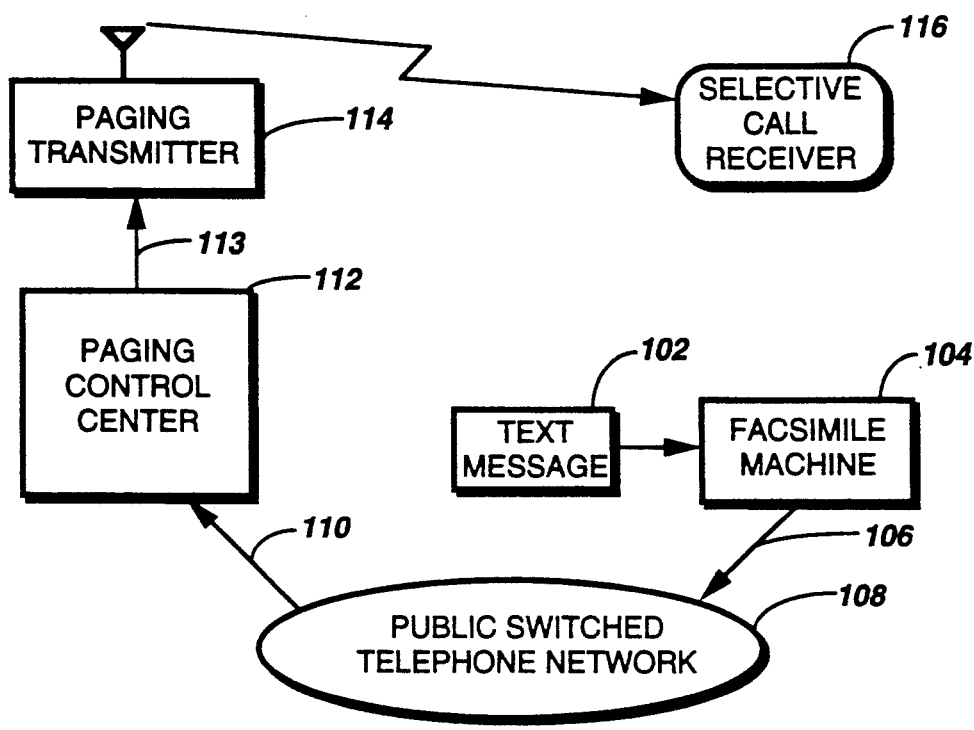
FIG. 1 is an electrical block diagram of a communication system in accordance with the preferred embodiment of the present invention.

With reference to FIG. 1, an electrical block diagram of a communication system in accordance with the preferred embodiment of the present invention depicts a facsimile machine 104. A text message 102 comprising handwritten or printed text on a sheet of paper is loaded into the facsimile machine 104 for transmission to a selective call receiver 116. The facsimile machine 104 is coupled to the public switched telephone network 108 by a first telephone line 106. By dialing a telephone access number for a second telephone line 110 coupled to a facsimile input 202 (FIG. 2) of a paging control center 112, a user of the facsimile machine 104 can couple the facsimile machine 104 with the paging control center 112 for transmitting the text message 102 to the paging control center 112. The facsimile machine 104 and the facsimile input 202 are compatible with, for example, the well-known Group Three facsimile standard of the CCITT. The paging control center 112 processes and encodes the text message 102, which is then coupled to a paging transmitter 114 by a control line 113 for transmitting the text message 102 in encoded format to the selective call receiver 116 capable of receiving and displaying both ASCII encoded characters and graphically encoded images.

Figure 2:
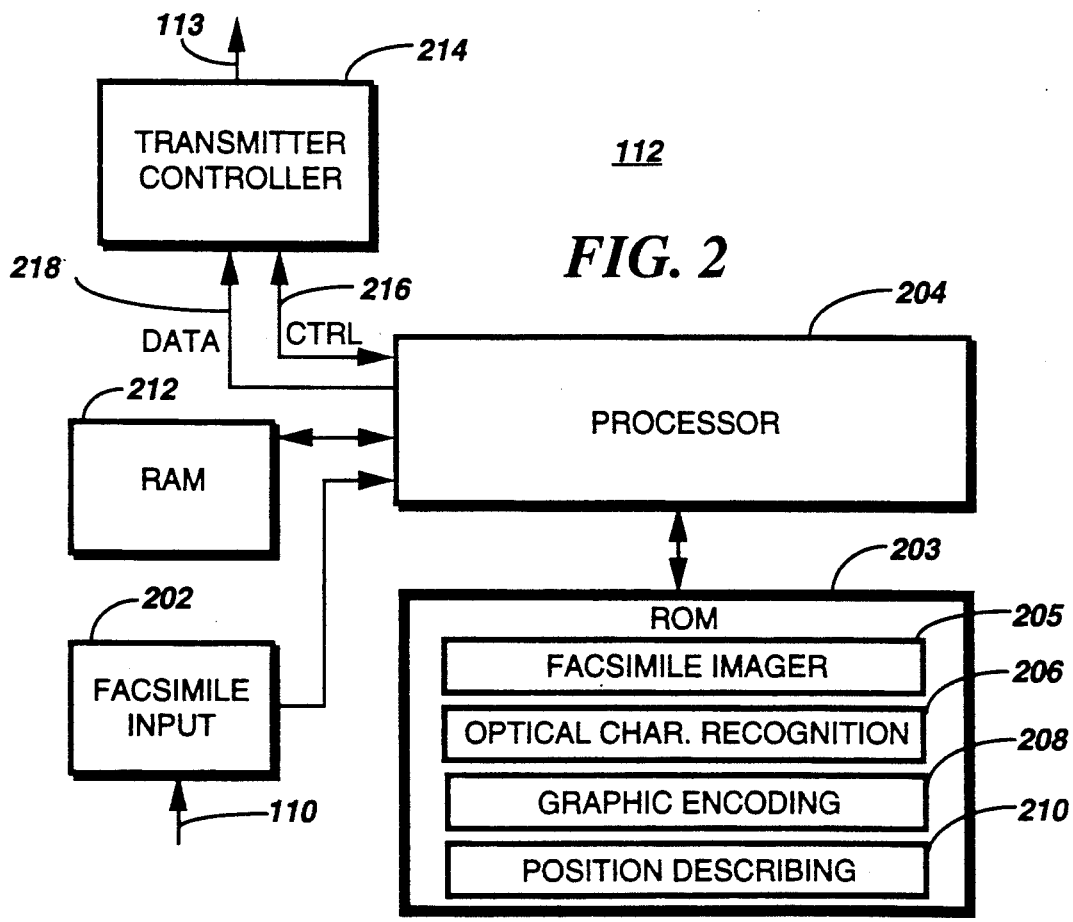
FIG. 2 is an electrical block diagram of a paging control center in accordance with the preferred embodiment of the present invention.

With reference to FIG. 2, an electrical block diagram of the paging control center 112 in accordance with the preferred embodiment of the present invention depicts the facsimile input 202 coupled to a processor 204 for processing the text message 102 (FIG. 1) received from the second telephone line 110. The processor 204 is coupled to a random access memory (RAM) 212 for storing data both before and after processing by the processor 204, and to a read-only memory (ROM) comprising software processing elements for processing the data received by the facsimile input 202. The software processing elements comprise a conventional facsimile imager 205 for creating a picture element (pel) map of the text message 102 and storing the pel map in the RAM 212.

The software processing elements further comprise a conventional optical character recognition (OCR) element 206 that parses the pel map to convert recognizable characters of the text message 102 into corresponding ASCII symbols and character size information for reducing transmission time between the paging control center 112 and the selective call receiver 116. The software processing elements additionally comprise a conventional graphic encoding element 208 that encodes graphic images and size information for characters that the OCR element 206 is unable to recognize with a confidence level higher than a pre-determined level. The software processing elements still further comprise a position describing element 210 that provides X-Y coordinate data for describing the relative positions of the characters of the text message 102 in accordance with the present invention.

The paging control center 112 also includes a transmitter controller 214 coupled to the paging transmitter 114 (FIG. 1) by the control line 113 for controlling the transmission of the text message 102 (FIG. 1) after encoding of the text message 102 for transmission. The transmitter controller 214 is coupled to the processor 204 by a management line 216 for managing the transmitter controller 214 and by a data line 218 for providing the text message 102 to the transmitter controller 214 after encoding by the processor 204.

One of ordinary skill in the art will appreciate that an alternate embodiment of the present invention would replace the facsimile input 202 with a page scanner for creating the pel map of the text message 102 (FIG. 1) when the sheet of paper comprising the text message 102 is scanned locally by the page scanner. One will also appreciate that the facsimile imager 205 will not be required when a page scanner is used for local input, because the page scanner provides the pel map to the processor 204 in a format ready to be stored in the RAM 212 for later parsing by the OCR element 206.

Figure 3:
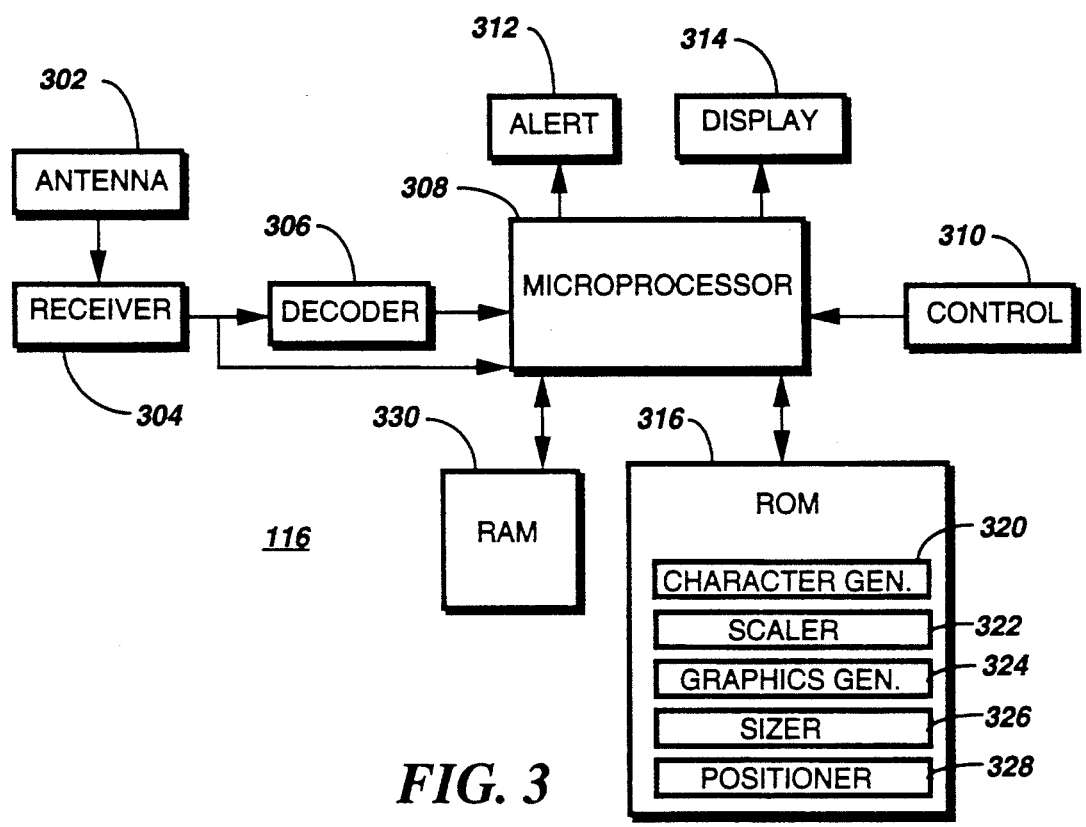
FIG. 3 is an electrical block diagram of a selective call receiver in accordance with the preferred embodiment of the present invention.

With reference to FIG. 3, an electrical block diagram of the selective call receiver 116 in accordance with the preferred embodiment of the present invention depicts an antenna 302 for intercepting radio signals comprising address and encoded text messages. A receiver 304 is coupled to the antenna 302 for demodulating the received radio signals to derive the address and encoded text messages. A decoder 306 is coupled to the receiver 304 for decoding the derived address messages. A microprocessor 308 is coupled to the receiver 304 for further processing the derived encoded text messages in accordance with the present invention.

The microprocessor 308 is coupled to a RAM 330 for storing received data both before and after processing by the processor 308. The microprocessor 308 is also coupled to a ROM 316, which comprises software processing elements that include a conventional character generation element 320 for generating characters in response to received character codes and a conventional scaler 322 for scaling the size of the generated characters in response to received character size information in conjunction with display capabilities of a display 314. The software processing elements also include a graphics generator 324 for generating graphic images in response to received graphic codes, and a sizing element 326 for sizing the graphic images relative to in response to received graphic image size information in conjunction with the display capabilities of the display 314. In addition, the software processing elements include a positioning element 328 for positioning the characters and graphic images generated so that the relative positions of the corresponding characters in the text message 102 (FIG. 1) are substantially reproduced.

The microprocessor 308 is also coupled to the display 314 for displaying received messages. Because the display 314 must be capable of displaying graphic characters in finely adjustable vertical and horizontal positions, the display is of a type that contains a continuous array of pixels in both the horizontal and vertical directions. A display of this type, for example, is used in portable LCD television receivers. The microprocessor 308 is also coupled to an alert device 312 comprising either an audible or tactile alert for alerting a user in response to receiving a message, and to a control section 310 comprising user interfaces, e.g., switches and indicators, for controlling the selective call receiver in a manner well-known to one of ordinary skill in the art.

Figures 4, 5:
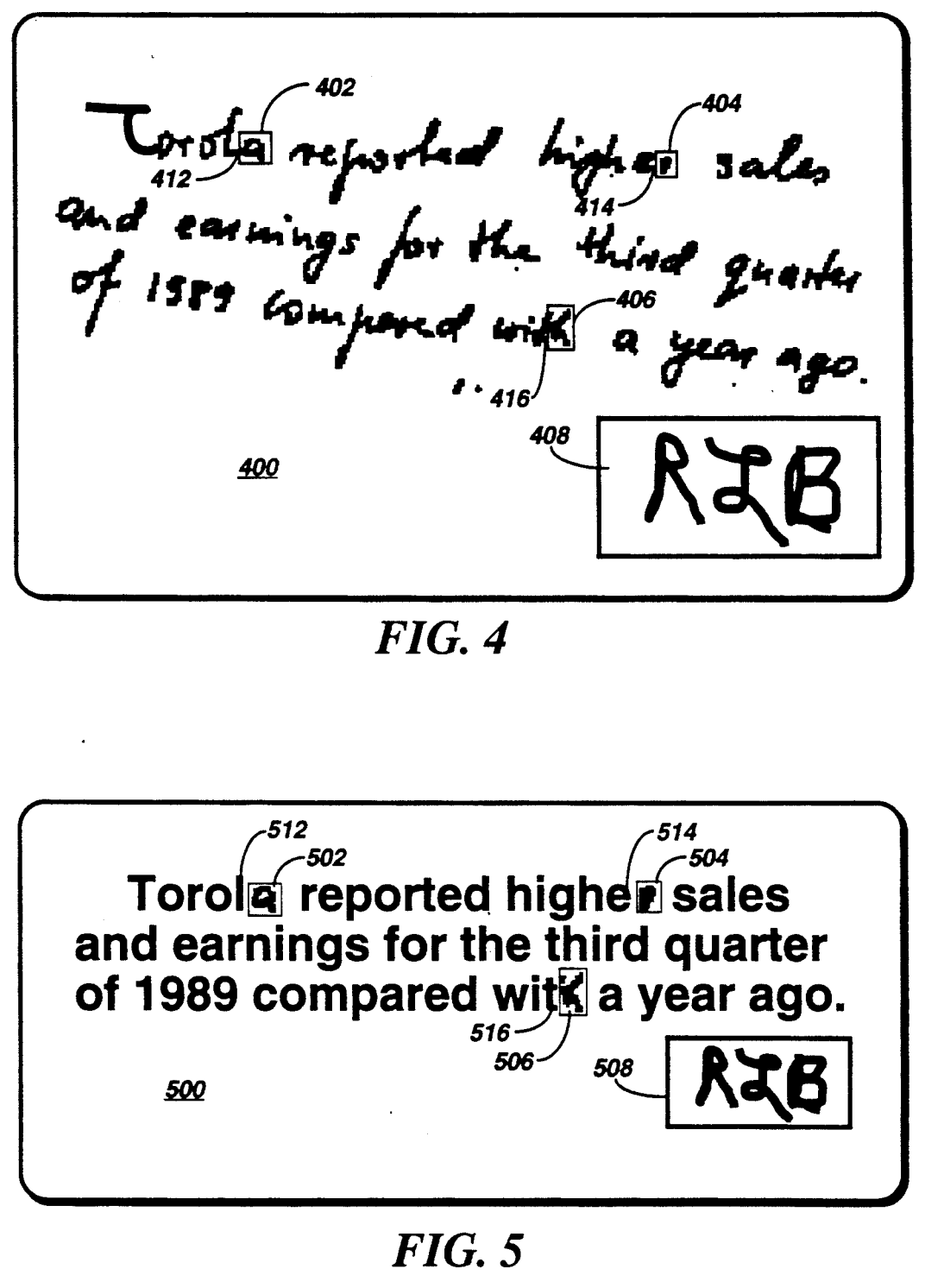

With reference to FIG. 4, a text message 400 received at the facsimile input 202 (FIG. 2), shown as the message would appear if printed by a facsimile machine receiving the same input signals present at the facsimile input 202, in accordance with the preferred embodiment of the present invention comprises characters 402, 404, 406 that are unrecognizable by the OCR element 206 (FIG. 2) after receipt. The OCR-unrecognizable characters 402, 404, 406 have relative positions with respect to adjacent OCR-recognizable characters 412, 414, 416, respectively. In addition, the text message 400 contains a specially marked area 408 that is intended to be transmitted in a graphic format without conversion to character codes.

With reference to FIG. 5, a reproduced message 500 of the text message 400 as reproduced in the selective call receiver 116 (FIG. 1) in accordance with the preferred embodiment of the present invention comprises graphic images 502, 504, 506 of the OCR-unrecognizable characters 402, 404, 406 (FIG. 4), respectively. In addition, the reproduced message 500 includes a graphic image 508 of the specially marked area 408 (FIG. 4). The graphic images 502, 504, 506, 508 are generated by the graphics generator 324 and sizing element 326 (FIG. 3) in response to received graphic codes and size information. The remainder of the reproduced message 500 comprises characters generated by the character generation element 320 and scaler 322 (FIG. 3) in response to received ASCII codes and size information.

In response to received X-Y coordinate data, the graphic images 502, 504, 506 are positioned relative to adjacent characters 512, 514, 516, respectively, by the positioning element 328 (FIG. 3). The positioning is done in a manner that substantially matches the relative positions between the corresponding OCR-unrecognizable characters 402, 404, 406 (FIG. 4) and the adjacent OCR-recognizable characters 412, 414, 416 (FIG. 4), respectively, to substantially reproduce and preserve the relative positions between the characters of the message 400 (FIG. 4). By preserving the relative positions between the characters as in the message 400, the present invention advantageously increases the probability that a human reader of the reproduced message 500 will be able to successfully recognize the OCR-unrecognizable characters 402, 404, 406 depicted by the graphic images 502, 504, 506, respectively.

Figure 6:
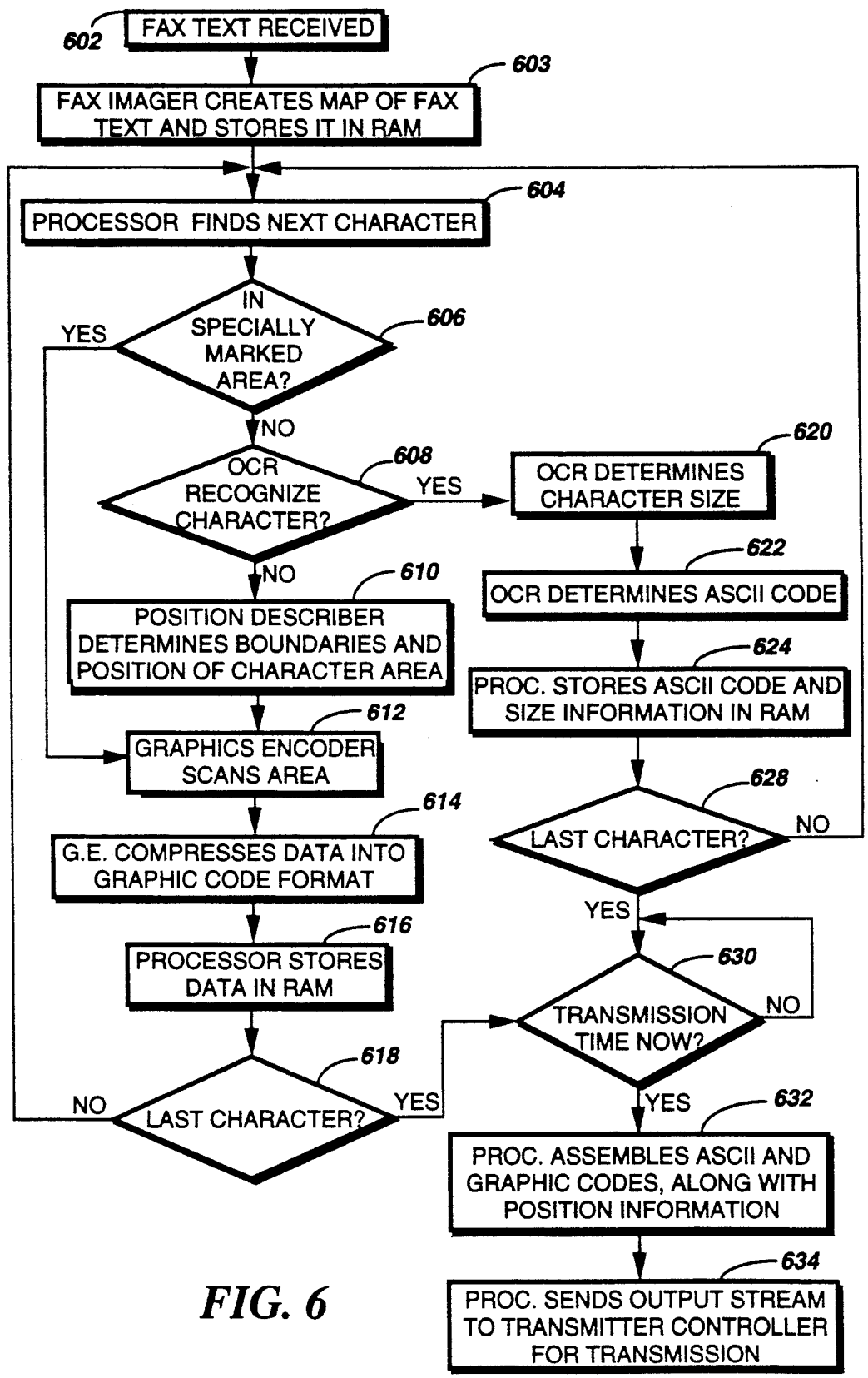
FIG. 6 is a flow chart of a method of transmitting encoded data in accordance with the preferred embodiment of the present invention.

With reference to FIG. 6, a flow chart of a method of transmitting encoded data in accordance with the preferred embodiment of the present invention begins with the facsimile input 202 (FIG. 2) receiving 602 a facsimile transmission comprising a text message. In response to receiving the message, the processor 204 (FIG. 2) accesses the facsimile imager 205 from the ROM 203 (FIG. 2) and creates in the RAM 212 (FIG. 2) a pel map of the received facsimile transmission. Next, the processor 204 accesses the OCR element 206 (FIG. 2) and does a conventional scan of the received data to eliminate white space and to find 604 a first character of the message.

Next, the processor 204 (FIG. 2) checks 606 the scanned received data to determine whether the character is inside a specially marked area, i.e., an area that is fully enclosed by a circle or box surrounding the area. If so, the processor 204 skips directly to step 612 to access the graphic encoding element 208 and begin graphic encoding of the contents of the specially marked area. Graphically encoding the specially marked area allows a message sender to force the paging control center 112 (FIG. 1) to transmit whatever is contained in the specially marked area without conversion to ASCII codes for reproduction by the character generator 320 (FIG. 3). This feature allows the contents of the specially marked area, for example, a signature, to be reproduced by the selective call receiver 116 (FIG. 1) as a graphic image. The feature advantageously enables, for example, signature verification.

If, on the other hand, in step 606 the processor 204 (FIG. 2) determines that the character is not in a specially marked area, then the processor 204 accesses the OCR element 206 (FIG. 2) and attempts to recognize the character. If in step 608 the OCR element 206 has recognized the character, then the OCR element 206 next determines 620 the size of the character, followed by determining 622 the ASCII code for the character. Next, the processor 204 (FIG. 2) stores 624 the ASCII code and size information in the RAM 212 (FIG. 2). The size information will be used as described herein below for reproducing scales of generated text characters and graphic images relative to one another to match the corresponding scales of characters in the received text message. Then, in step 628 the processor 204 checks whether the character is the last character of the text message. If not, the processor 204 returns to step 604 to find and to process the next character. If in step 628 the character is determined to be the last character of the text message, then the processor waits 630 for a pre-determined transmission time for sending the message to the selective call receiver 116 (FIG. 1).

If, on the other hand, in step 608 the OCR element 206 (FIG. 2) cannot recognize the character, then the processor 204 (FIG. 2) uses the position describing element 210 (FIG. 2) to determine 610 the boundaries and position of the character area. Next, the processor 204 accesses the graphic encoding element 208 (FIG. 2) to scan 612 the character area, followed by compressing 614 the scanned data into a graphic code format, e.g., the run-length coded compression of the CCITT Group Three facsimile standard. Next, the processor 204 stores 616 the graphic codes along with size and position information in the RAM 212 (FIG. 2), after which the processor 204 checks 618 whether the character is the last character of the text message. If not, the processor 204 returns to step 604 to find and process the next character. If in step 618 the character is determined to be the last character of the text message, then the processor, as before, waits 630 for the pre-determined transmission time for sending the message to the selective call receiver 116 (FIG. 1).

When in step 630 the pre-determined transmission time arrives, the processor 204 (FIG. 2) accesses 632 the RAM 212 (FIG. 2) to retrieve and assemble the ASCII and graphic codes and the size and position information stored earlier during processing of the text message. Following this, the processor 204 sends 634 the assembled ASCII and graphic codes and the size and position information to the transmitter controller 214 (FIG. 2) for transmission to the selective call receiver 116 (FIG. 1).

Figure 7:
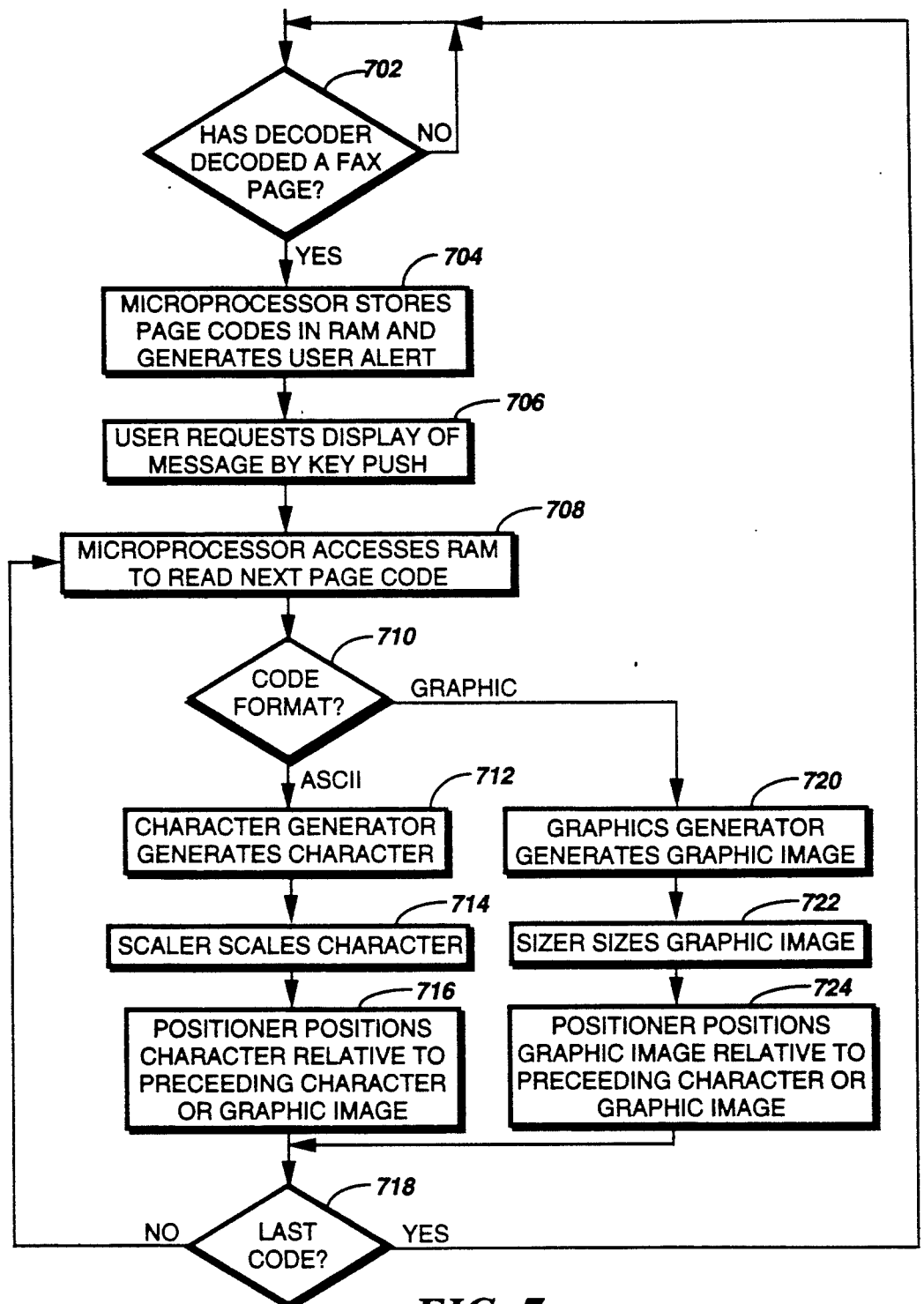
FIG. 7 is a flow chart of a method of receiving the encoded data in accordance with the preferred embodiment of the present invention.

With reference to FIG. 7, a flow chart of a method of receiving the encoded data in accordance with the preferred embodiment of the present invention begins with the decoder 306 (FIG. 3) decoding 702 an address assigned to receiving a facsimile page in the selective call receiver 116 (FIG. 1). Next, the microprocessor 308 (FIG. 3) receives the ASCII and graphic codes and the size and position information for the facsimile page comprising a text message from the receiver 304 (FIG. 3). In response, the microprocessor 308 stores 704 the ASCII and graphic codes and the size and position information received in the facsimile page in the RAM 330 (FIG. 3), and enables the alert device 312 (FIG. 3) to generate an alert to inform a user that a page has been received. Next the user requests 706 display of the received text message on the display 314 (FIG. 3) by depressing a key of the control section 310 (FIG. 3). In response, the microprocessor 308 accesses 708 the RAM 330 to retrieve the first ASCII or graphic code and the corresponding size and position information.

If in step 710 the microprocessor 308 (FIG. 3) determines that the code format is ASCII, then the microprocessor 308 accesses software of the character generation element 320 (FIG. 3) and generates 712 a character corresponding to the ASCII code, and then accesses software of the scaler 322 (FIG. 3) preferably to scale 714 the character according to the corresponding size information. Scaling allows locally generated characters to be reproduced with the same relative sizes as in the message originally received by the facsimile input 202 (FIG. 2). Alternatively, the scaling may be omitted and all locally generated characters displayed in a single size. Next, the microprocessor 308 uses software comprising the positioning element 328 (FIG. 3) to position 716 the character relative to the preceding character or graphic image according to the corresponding position information for the character. (In the case of the very first character of the text message the position used instead is the upper left corner of the display 314.) In step 718 the microprocessor 308 checks whether the code just processed is the last code of the text message. If so, the process of displaying the text message is done, and the microprocessor 308 returns to step 702 to wait for another facsimile page.

If, on the other hand, the microprocessor 308 (FIG. 3) determines in step 718 that the code just processed is not the last code of the text message, then the microprocessor 308 returns to step 708 to retrieve the next code for processing. If in step 710 the next code is a graphic code, the processor accesses software comprising the graphics generator 324 (FIG. 3) to generate 720 a graphic image from the graphic code. Next, the processor uses software of the sizing element 326 to size 722 the graphic image according to corresponding size information received, and software of the positioning element 328 to position 724 the graphic image relative to the preceding character or graphic image according to corresponding position information received. (In the case of the very first character of the text message the positioning element 328 positions 724 the graphic image relative to the upper left corner of the display 314 according to corresponding position information received.)

As before, the processor 308 (FIG. 3) checks 718 whether the code just processed is the last code of the text message. If so, the process of displaying the text message is done, and the microprocessor 308 returns to step 702 to wait for another facsimile page. If, on the other hand, the microprocessor 308 (FIG. 3) determines in step 718 that the code just processed is not the last code of the text message, then the microprocessor 308 returns to step 708 to retrieve the next code for processing.

Thus, the present invention provides a better method and apparatus for encoding and receiving text messages input by facsimile input. A method and apparatus are provided that dynamically switch between character code transmission and graphic code transmission depending on the quality of input characters. When required by the presence of poorly formed characters, the method and apparatus send graphic codes to use the superior ability of humans to recognize characters compared to the ability of conventional optical character recognition (OCR) techniques. When the confidence level is high that OCR techniques are correctly recognizing a character, the method and apparatus send ASCII codes to use the ability of OCR-generated character codes to save transmission time. In this manner the number of characters that can be sent by a transmission system having a pre-determined data rate is advantageously maximized, while OCR error rate is advantageously minimized. Also, by maintaining the relative size and position of all the characters reproduced, the method and apparatus deliver text messages that are optimally readable by humans.

I claim:

1. A method of transmitting and receiving encoded data derived from input data generated by a user, the input data comprising substantially readable text characters in a radio paging system comprising an optical character recognition element and a graphic encoding element, the radio paging system further comprising a radio transmitter and a selective call radio receiver, the method comprising the steps of:

(a) accepting the input data comprising the substantially readable text characters at an input of the radio paging system;

(b) encoding as character code format data the substantially readable text characters received in step (a) that are recognizable by the optical character recognition element;

(c) encoding as graphic code format data the substantially readable text characters received in step (a) that are not recognizable by the optical character recognition element;

(d) assembling the character code format data encoded in step (b) and the graphic code format data encoded in step (c) into an output data stream, the output data stream including information that describes original sizes and positions relative to one another of the substantially readable text characters;

(e) transmitting an address assigned to the selective call radio receiver, along with the output data stream assembled in step (d) in a radio signal from the radio transmitter;

(f) receiving by the selective call radio receiver the address and the output data stream transmitted in step (e); and (g) converting within the selective call radio receiver the output data stream received in step (f) into substantially readable text characters.

2. The method in accordance with claim 1, wherein step (a) comprises the step of:

(h) receiving the input data in a format defined by a standard facsimile transmission protocol.

3. The method in accordance with claim 1, wherein step (b) comprises the step of:

(i) adding size information to complete the character code format data.

4. The method in accordance with claim 1, wherein step (c) comprises the steps of:
(j) determining the boundaries of the substantially readable text characters that are defined as not recognizable by the optical character recognition element;
(k) scanning within the boundaries determined in step (j) to form graphic images of the substantially readable text characters;
(l) performing data compression on the graphic images scanned in step (k) to partially form the graphic code format data; and
(m) adding size and location information to complete the graphic code format data.

5. The method in accordance with claim 1, wherein step (a) comprises the steps of:
(n) receiving information specially identifying a portion of the input data that is not intended by the user to be encoded as character code format data, even though the specially identified portion of the input data comprises characters that are recognizable by the optical character recognition element; and
(o) defining the specially identified portion of the input data to be ineligible for encoding as character code format data, thereby forcing the specially identified portion to be encoded as graphic code format data in step (c).

6. The method in accordance with claim 1, wherein step (g) comprises the steps of:
(p) generating characters in response to character code format data received in the output data stream;
(q) scaling the characters generated in step (p) in accordance with scale information received with the character code format data;
(r) generating graphic images in response to graphic code format data received in the output data stream;
(s) sizing the graphic images generated in step (r) in accordance with size information received with the graphic code format data; and
(t) substantially preserving the original positions relative to one another of the substantially readable text characters thus generated by conversion of the output data stream.

7. An apparatus in a radio paging system which transmits and receives by radio signals encoded data derived from input data generated by a user, the input data comprising substantially readable text characters, the apparatus comprising in a radio paging system controller:
input means for accepting the input data;
memory means coupled to a processor means for storing encoded data generated by an optical character recognition means and a graphic encoding means;
radio transmitter controller means coupled to the processor means for controlling radio transmissions of the encoded data; and
the processor means coupled to the input means for processing the input data, wherein the processor means comprises:
the optical character recognition means for encoding a first portion of the substantially readable text characters of the input data into character code format data, wherein the first portion comprises characters that are recognizable by the optical character recognition means and that have not been specially identified by the user as ineligible for encoding as character code format data;
the graphic encoding means for encoding a second portion of the substantially readable text characters of the input data into graphic code format data, wherein the second portion comprises characters that are not recognizable by the optical character recognition means and characters that have been specially identified by the user as ineligible for encoding as character code format data, even though the specially identified characters may be recognizable by the optical character recognition means; and
position description means for describing original positions relative to one another of the substantially readable text characters.

8. The apparatus in accordance with claim 8, further comprising in a selective call radio receiver:
an antenna for intercepting the radio transmissions;
radio receiver means coupled to the antenna for receiving the radio transmissions and decoding the encoded data;
conversion means coupled to the radio receiver means for converting the encoded data into displayable text characters and graphic images; and
display means coupled to the conversion means for displaying the displayable text characters and graphic images in a substantially readable presentation.

9. The apparatus in accordance with claim 8, wherein the conversion means comprises:
character generation means;
scaling means coupled to the character generation means for scaling characters generated by the character generation means;
graphic image generation means coupled to the character generation means for generating graphic images;
sizing means coupled to the graphic image generation means for sizing graphic images generated by the graphic image generation means; and
positioning means coupled to the scaling means and to the sizing means for substantially preserving the original positions relative to one another of the substantially readable text characters in response to received position description information.

10. The apparatus in accordance with claim 8, wherein the input means comprises a facsimile receiver compatible with a standard facsimile transmission protocol.

11. The apparatus in accordance with claim 8, wherein the optical character recognition means comprises scale specification means for specifying scale of ones of the substantially readable text characters of the first portion of the input data.

12. The apparatus in accordance with claim 8, wherein the graphic encoding means comprises:
boundary determination means for determining boundaries of ones of the second portion of the substantially readable text characters of the input data;
scanning means coupled to the boundary determination means for scanning within the boundaries determined to form graphic images of the substantially readable text characters;

data compression means coupled to the scanning means for performing data compression on the graphic images scanned to produce compressed graphic images; and size specification means coupled to the data compression means for adding size information to the compressed graphic images.

13. A communications controller in a radio paging system which transmits and receives by radio signals encoded data derived from input data generated by a user, the input data comprising substantially readable text characters, the communications controller comprising:

an input receiver for accepting the input data;

a memory coupled to a processor for storing encoded data generated by an optical character recognition element and a graphic encoding element;

a radio transmitter controller coupled to the processor for controlling radio transmissions of the encoded data; and the processor coupled to the input receiver for processing the input data, wherein the processor comprises:

the optical character recognition element for encoding a first portion of the substantially readable text characters of the input data into character code format data, wherein the first portion comprises characters that are recognizable by the optical character recognition element and that have not been specially identified by the user as ineligible for encoding as character code format data;

the graphic encoding element for encoding a second portion of the substantially readable text characters of the input data into graphic code format data, wherein the second portion comprises characters that are not recognizable by the optical character recognition element and characters that have been specially identified by the user as ineligible for encoding as character code format data, even though the specially identified characters may be recognizable by the optical character recognition element; and position description means for describing original positions relative to one another of the substantially readable text characters.

14. The communications controller in accordance with claim 13, wherein the input receiver comprises a facsimile receiver compatible with a standard facsimile transmission protocol.

15. The communications controller in accordance with claim 13, wherein the optical character recognition element comprises scale specification means for specifying scale of ones of the substantially readable text characters of the first portion of the input data.

16. The communications controller in accordance with claim 14, wherein the graphic encoding element comprises:

boundary determination means for determining boundaries of ones of the second portion of the substantially readable text characters of the input data;

scanning means coupled to the boundary determination means for scanning within the boundaries determined to form graphic images of the substantially readable text characters;

data compression means coupled to the scanning means for performing data compression on the graphic images scanned to produce compressed graphic images; and size specification means coupled to the data compression means for adding size information to the compressed graphic images.

17. A selective call receiver for use in a communication system that transmits and receives by radio signals encoded data derived from input data generated by a user, the input data comprising substantially readable text characters having original scales and positions relative to one another, the selective call receiver comprising:

an antenna for intercepting the radio signals;

radio receiver means coupled to the antenna for receiving the radio signals comprising an address and the encoded data;

a selective call address decoder coupled to the radio receiver for decoding the address;

a processor coupled to the selective call address decoder for processing the encoded data, wherein the processor processes the encoded data in response to the decoded address being a facsimile address assigned to the selective call receiver, and wherein the processor does not process the encoded data in response to the decoded address not being a facsimile address assigned to the selective call receiver;

a conversion element coupled to the receiver for converting the encoded data into locally generated text characters and graphic images of text characters, the conversion element comprising:

a sizing element for sizing the graphic images of text characters relative to the locally generated text characters to substantially reproduce the original scales of the substantially readable text characters relative to one another; and a positioning element coupled to the sizing element for positioning the graphic images of text characters relative to the locally generated text characters to substantially reproduce the original positions of the substantially readable text characters relative to one another; and a display coupled to the conversion element for displaying the displayable text characters and graphic images.

18. The selective call receiver in accordance with claim 17, wherein the conversion element further comprises:

a character generator for generating the locally generated text characters;

a scaler coupled to the character generator for scaling the locally generated text characters; and a graphic image generator coupled to the character generator for generating the graphic images of text characters.

* * * * *

UNITED STATES PATENT AND TRADEMARK OFFICE
CERTIFICATE OF CORRECTION

PATENT NO. : 5,331,431
DATED : July 19, 1994
INVENTOR(S) : Jasinski

It is certified that error appears in the above-indentified patent and that said Letters Patent is hereby corrected as shown below:

Column 10, line 21, delete "8" and insert --7--.
Column 12, line 22, before "radio" insert --a--.

Signed and Sealed this

Twenty-first Day of February, 1995

Attest:

BRUCE LEHMAN

Attesting Officer

Commissioner of Patents and Trademarks